Aug. 17, 1926.
J. H. SCHMIDT
MILK STRAINER
Filed March 26, 1926
1,596,312
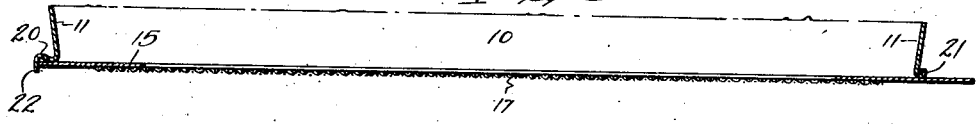
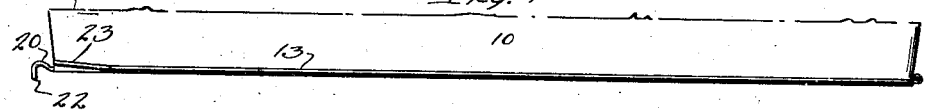
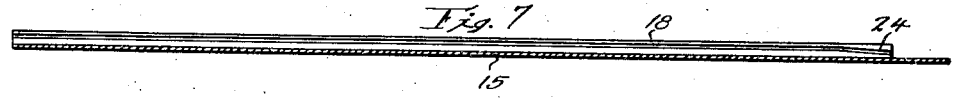
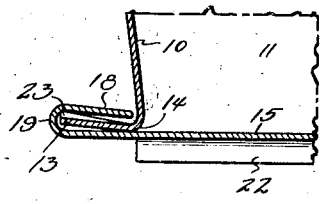
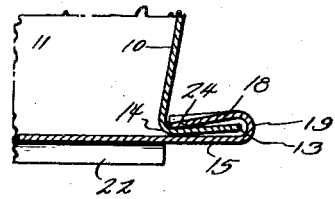
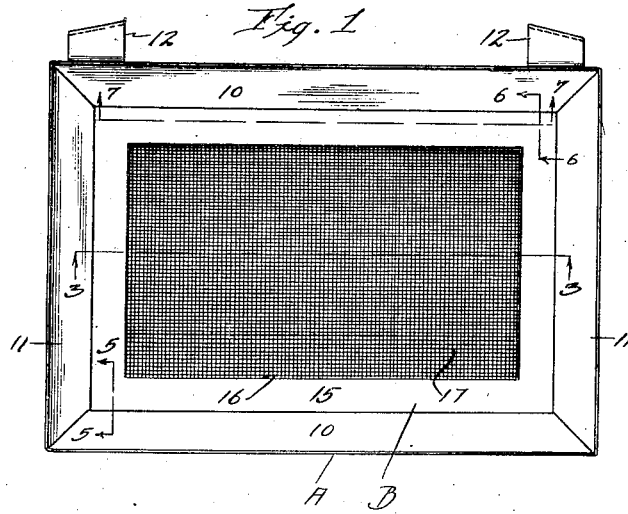
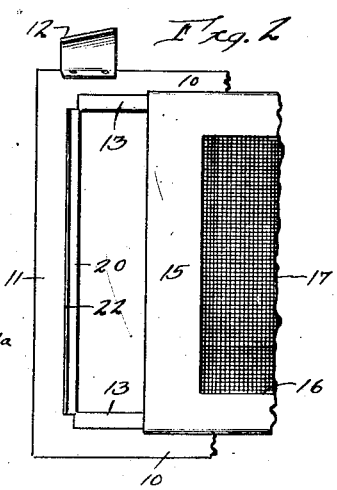
Inventor
John H. Schmidt
By Lynn H. Latta
Attorney Patented Aug. 17, 1926.

1,596,312

UNITED STATES PATENT OFFICE.

JOHN H. SCHMIDT, OF HOLSTEIN, IOWA.

MILK STRAINER.

Application filed March 26, 1926. Serial No. 97,561.

My invention relates to milk strainers, and it is primarily my object to provide one which may be easily cleaned.

A further object is to provide such a strainer which is of simple, durable and inexpensive construction.

More specifically it is my object to provide a strainer having a removable screened bottom, attachable in such a way that the parts are all accessible to a brush when the bottom is removed.

A further object is to provide a removable bottom, attachable to the strainer in a simple manner, allowing locking of the bottom against the edges of the strainer side walls so as to prevent leaking through the joints between the side walls and bottom.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a plan view of the strainer.

Fig. 2 is an inverted plan of a portion of the strainer, the bottom being partially removed.

Fig. 3 is a longitudinal sectional view, taken on the line 3—3 of Fig. 1.

Fig. 4 is an elevation of the strainer side wall at its lower portion.

Fig. 5 is a detail sectional view, taken on the line 5—5 of Fig. 1.

Fig. 6 is a detail sectional view, taken on the line 6—6 of Fig. 1, and

Fig. 7 is a longitudinal sectional view through the bottom, taken on the line 7—7 of Fig. 1, the rest of the strainer not being shown.

One of the objections to the ordinary milk strainer is the difficulty of cleaning it after it has been used, especially in the corners between the bottom and sides of the strainer. Bacteria lodging in such corners may easily infect milk which is passed through the strainer, and any particles of milk remaining in the strainer will ferment and inoculate the fresh milk subsequently strained therethrough, so as to cause it to sour prematurely.

These difficulties are removed with the use of my strainer, which I will now describe.

In the preferred form of my invention the strainer comprises a side wall portion, A, and a bottom member, B. The side wall portion, A, is preferably formed rectangular, as shown in Fig. 1, with the side walls, 10, and the end walls, 11. Hooks, 12, secured to one of the sides, 10, serve to suspend the strainer from the edge of the pail or other receptacle.

It will be understood that the strainer might take the form of a truncated cone or cylinder, the lower edges, however, being brought to parallel positions.

The purpose of so forming the lower edges parallel is to allow a sliding connection between the bottom, B, and the side wall member, A. To this end, the lower edges of the side wall, 10, are bent outwardly and slightly upwardly to form flanges, 13 (see Figs. 5 and 6). In thus forming the flanges the lower extremities of the side walls, 10, will be formed with rounded shoulders, 14.

The bottom, B, comprises a frame, 15, of flat sheet metal having an opening, 16, over which is secured by soldering the usual copper or brass meshing, 17. The sides of the frame, 15, are bent back upon themselves to form flanges, 18, which are substantially parallel to the flanges, 13, as shown in Fig. 5, and are so spaced from the body of the frame, 15, as to form channels freely receiving the flanges, 13. The channels, including the flanges, 18, and the body of the frame, 15, I will refer to by the numeral 19.

The lower extremities of the end walls, 11 and 11ª, are bent outwardly and upwardly, as at 20 and 21, respectively, to form rounded shoulders, against which the frame of the bottom may engage. These shoulders are coplanar with the rounded shoulders, 14, forming the lower extremities of the side, 10, and may be so joined thereto at the corners, as shown in Fig. 2, as to form a continuous bearing surface around the entire mouth of the strainer.

The shoulder portion, 20, takes the form of a flange which is bent downwardly, as at 22, to form a stop for the bottom.

By forming the channels, 19, on the bottom member, it will be seen that when the bottom member is removed a brush may readily be run through the channel to clean it of all foreign materials. There is nothing to hinder the action of the brush, the channel being open at either end. The screen may be scrubbed thoroughly by laying the bottom on a flat surface and brushing longitudinally thereof. The flanges on the sides being turned outwardly, there is nothing to obstruct the free action of the brush in a vertical direction in cleaning the inside of the member, A. The channels between the flanges, 13, and the sides, 10, are easily cleaned since they are free and open at their ends. The channel between the stop, 22, and the flange, 20, may be likewise cleaned with a brush since it is open at either end with nothing obstructing the free action of the brush.

The width of the channel, 19, allows not only a proper cleaning of the channel, but also allows the bottom to be inserted over the flanges, 13, and slid longitudinally thereof without binding. This is very important for the reason that should there be any binding action between the sliding bottom and the side members there would be a tendency to try to force the bottom into place, which would probably result in a warping of the bottom or a binding of the sides in such a manner that there would no longer be a tight joint between the bottom and sides when the bottom was in place.

In order to bring the bottom to a snug fit against the lower extremity of the side walls when the bottom is in place, the ends of the flanges, 13, adjacent the stop, 22, are inclined slightly as at 23 in Fig. 4, and the opposite ends of the flanges, 18, are declined, as at 24 in Fig. 7.

It will be seen that as the bottom approaches closed position relative to the strainer side walls the inclined and declined portions will engage their respective coacting flanges to urge the frame of the bottom upwardly to a snug fit against the rounded shoulder portions, 14, 20 and 21.

Figs. 5 and 6 illustrate the action of the portions, 23 and 24, in serving this object.

The stop, 22, limits the movement of the bottom, 15, relative to the side walls of the strainer at the proper point and prevents the portions, 23 and 24, being sprung out of position.

The slight upward inclination of the flanges, 13, insures the proper sealing of the bottom at all points around the periphery of the strainer opening, and thus leaking at the corners is prevented.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a milk strainer, a wall having parallel lower side portions bent outwardly and upwardly to form flanges, and having connecting end edges coplanar with the lowest extremities of the side portions, the flanges having at one end longitudinally inclined portions, and a screened slidably removable bottom having its edges inturned to form channels receiving the flanges of the side walls, said inturned edges having declined portions engaging the flanges of the side walls at their ends opposite the inclined portions.

2. In a milk strainer, a wall having parallel lower side portions bent outwardly to form flanges, and having connecting end edges coplanar with the lowest extremities of the side portions, the flanges having at one end longitudinally inclined portions, and a screened slidably removable bottom having its edges inturned to form channels receiving the flanges of the side walls, said inturned edges having declined portions engaging the flanges of the side walls at their ends opposite the inclined portions.

Signed at Holstein, in the county of Ida, and State of Iowa, this 16th day of March, 1926.

JOHN H. SCHMIDT.